Dec. 30, 1930.    D. E. SPEICHER    1,787,330
ADJUSTABLE GUARD FOR POULTRY FEEDERS
Filed Jan. 3, 1929
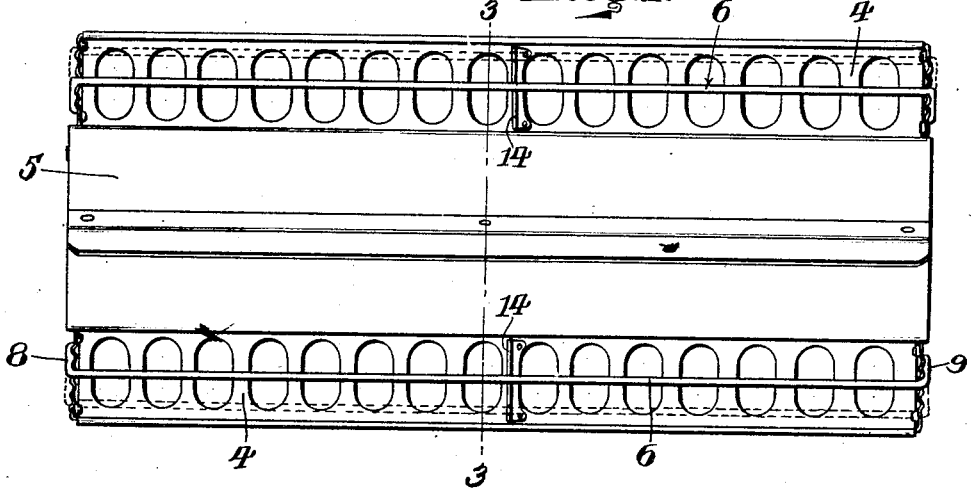
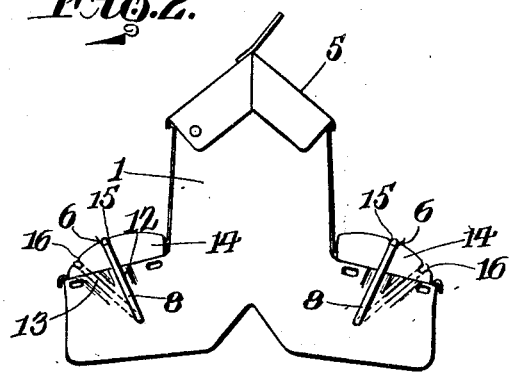
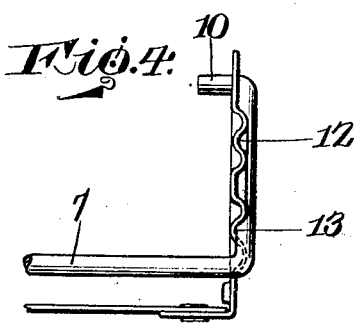
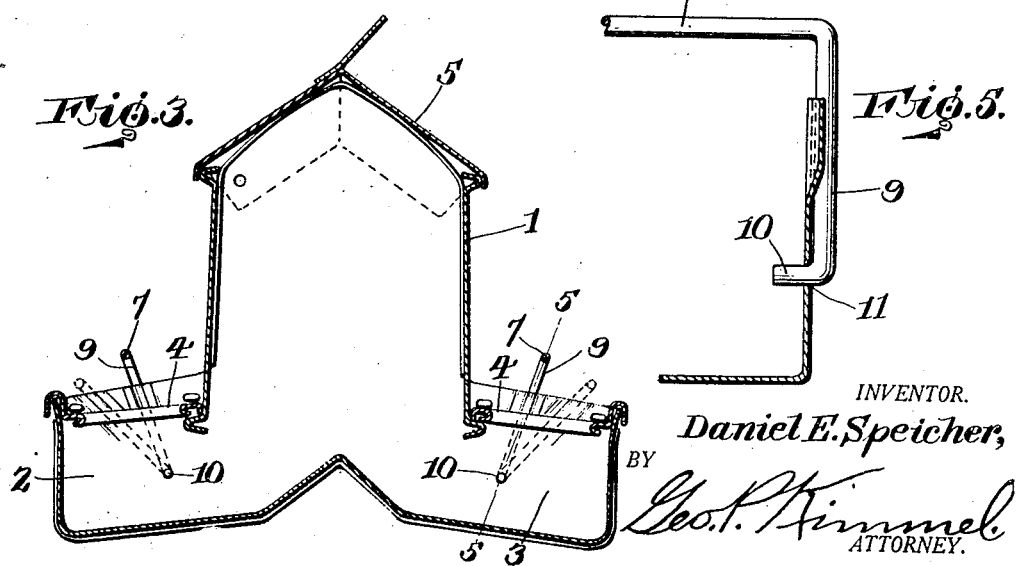
INVENTOR.
Daniel E. Speicher,
BY
Geo. P. Kimmel
ATTORNEY.

Patented Dec. 30, 1930

1,787,330

UNITED STATES PATENT OFFICE

DANIEL E. SPEICHER, OF URBANA, INDIANA, ASSIGNOR TO THE CYCLONE MANUFACTURING COMPANY, OF URBANA, INDIANA, A CORPORATION

ADJUSTABLE GUARD FOR POULTRY FEEDERS

Application filed January 3, 1929. Serial No. 330,003.

This invention relates to poultry feeders for small chicks, but more particularly to an adjustable guarding means therefor, and the invention has for its object to provide, in a manner as hereinafter set forth, an adjustable guarding means for use in connection with chick feeders to prevent the billing of the chicks, thus saving the feed.

Further objects of the invention are to provide, in a manner as hereinafter set forth, an adjustable guarding means for the purpose referred to which is simple in its construction and arrangement, strong, durable, thoroughly efficient in its use, conveniently adjusted, detachably retained in its adjusted position, readily assembled with respect to a feeder and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view of a chick feeder showing the adaptation therewith of an adjustable guarding means in accordance with this invention.

Figure 2 is an end view of the feeder showing the arrangement therewith of the adjustable guarding means.

Figure 3 is a section on line 3—3 Figure 1.

Figure 4 is a fragmentary view in top plan of the guarding means illustrating the same in one of its adjusted positions with respect to the feeder.

Figure 5 is a section on line 5—5 Figure 3 and which illustrates the guarding means in another of its adjusted positions.

The adjustable guarding means is illustrated by way of example in connection with a feeder having a pair of oppositely extending feed containers, a guarding means being associated with each container.

The feeder as illustrated includes an open top and bottom feed hopper 1, a pair of oppositely disposed feed containers 2, 3 into which opens the hopper 1, a combined feed grate and catch tray forming element 4 arranged within each feed container near the top thereof, and a hinged cover 5 for the open top of the feed hopper 1. The foregoing elements are specifically described in my copending application filed January 3, 1929, Serial Number 330,004.

The adjustable guarding means, in accordance with this invention includes a guard member 6 of inverted yoke-shape formed from wire of the desired rigidity. The member 6 includes a top bar 7 of a length greater than the length of a feed container and further includes a pair of side bars 8, 9 each having its lower end provided with a right angularly disposed, inturned part 10 which provides a pivot.

The end walls 11 of a feed container are provided with aligning openings 12 through which extend the parts 10, these latter pivoting against the walls of the openings 11. The length of the side bars 8, 9 is such that when pivotally connected to the end walls of a feed container such side bars will project a substantial distance thereabove.

Each end wall of a feed container is formed with a pair of outwardly opening grooves 12, 13 and with the former arranged forwardly of the latter. The grooves 12, 13 are disposed at an upward and outward inclination from their lower ends, but the inclination of the groove 13 is greater than the inclination of the groove 12. The width of the grooves 12, 13 is such relative to the diameter of the end bars 8, 9 so as to set up a frictional clutch to detachably retain the end bars within the grooves when the guard member is shifted to any one of the desired adjusting positions therefor. The normal position of the guard member is as illustrated in Figure 3 and when in such position the end bars thereof detachably engage in the grooves 12. The other position of the guard member is as illustrated in Figure 3 in dotted lines and such position is that the end bars are detachably engaged in the grooves 13. When the guard member is detachably connected in the full line position shown in Figure 5 the bar 7 will be positioned a greater distance above the feed container than what the position of said bar would be if the bars 8, 9 are engaged in the grooves 13 and which is illustrated in dotted lines in Figure 3.

The guarding means functions so that when it is engaged in the grooves nearest the feed hopper when chicks begin to feed, they eat under the bar 7, thus saving the feed. When they are a few weeks old, and begin to bill the feed, the guard member is positioned in the grooves nearest the front of the feed container, and the chicks eat over the bar 7, thus saving the feed.

Secured to and disposed transversely of the upper face of each grate 4 is an upstanding support 14 for a guard member. The top edge of support 14 is of arcuate contour and formed with a pair of spaced notches 15, 16, the former coacting with groove 12 and the latter with groove 13. The notches 15, 16 selectively receive the top bar 7 whereby the latter is braced by support 14.

It is thought the many advantages of a guarding means for the purpose referred to and constructed in accordance with this invention can be readily understood, and although the preferred embodiment of the invention is as illustrated and described, yet it is to be understood that changes in the details of construction can be had which fall within the scope of the invention as claimed.

What I claim is:

1. In a poultry feeder having an open top container provided with end walls, an angularly adjustable, inverted yoke-shaped feed guard for extension over the top of the open container and having its ends opposing the outer faces of and pivotally connected to said end walls of the container, said guard being of greater length than the length of the container.

2. In a poultry feeder, an open top feed container having a pair of opposed walls thereof each formed with a pair of grooves, one of said grooves arranged in advance of the other, said grooves being disposed at an inclination and with the inclination of the forward groove greater than the inclination of the rear groove, and an inverted, yoke-shaped guard extending over the open top of the container and having its ends pivotally connected to said opposed walls, said grooves selectively receiving the ends of the guard for retaining it in selective angular positions.

3. In a poultry feeder the combination with an open top feed container, of an angularly adjustable, inverted, yoke-shaped guard for extension over the top of the container, said guard having its ends pivotally mounted in a pair of opposed walls of said container, and said walls having means coacting with the ends of the guard for detachably securing it in adjusted positions.

4. An angularly adjustable guard for open top feed containers for poultry consisting of an inverted, yoke-shaped feed guard member comprising an outer bar and a pair of end bars, said outer bar for positioning stationary across said open top and said end bars each having the free end thereof provided with an inturned, right angularly disposed portion to provide a pivot therefor for seating in a wall of the container.

5. In a poultry feeder, an open top feed container, an angularly adjustable, inverted, yoke-shaped feed guard for extension over the open top of the container, said guard formed with spaced, oppositely extending, right angularly disposed means to provide pivots therefor, said pivots mounted in opposed walls of the container.

6. In a poultry feeder, an open top feed container, an angularly adjustable, inverted, yoke-shaped feed guard for extension over the open top of the container, said guard formed with spaced, oppositely extending, right angularly disposed means to provide pivots therefor, said pivots mounted in opposed walls of the container, and a notched support for receiving said guard to brace the latter in an upstanding position and connected to one of the walls of the container to which a pivot is mounted.

7. An angularly adjustable guard for open top feed containers for poultry consisting of an inverted, yoke-shaped feed-guard member comprising an outer bar and a pair of end bars, said outer bar for positioning across the open top of the container and said end bars each having the free end thereof provided with an inturned, right angularly disposed portion to provide a pivot therefor for seating in a wall of the container, and a notched support for receiving said guard to brace the latter in an upstanding position and carried by a wall of the container.

In testimony whereof, I affix my signature hereto.

DANIEL E. SPEICHER.